(12) United States Patent
Gross et al.

(10) Patent No.: US 11,548,266 B2
(45) Date of Patent: Jan. 10, 2023

(54) SCRATCH AND DAMAGE RESISTANT LAMINATED GLASS ARTICLES

(71) Applicant: CORNING INCORPORATED, Corning, NY (US)

(72) Inventors: Timothy Michael Gross, Corning, NY (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 143 days.

(21) Appl. No.: 16/824,101

(22) Filed: Mar. 19, 2020

(65) Prior Publication Data
US 2020/0307165 A1 Oct. 1, 2020

Related U.S. Application Data

(60) Provisional application No. 62/826,328, filed on Mar. 29, 2019.

(51) Int. Cl.
*B32B 17/06* (2006.01)
*B32B 7/023* (2019.01)
(Continued)

(52) U.S. Cl.
CPC .............. *B32B 17/06* (2013.01); *B32B 7/023* (2019.01); *C03B 17/064* (2013.01);
(Continued)

(58) Field of Classification Search
CPC ......... B32B 7/00–7/14; B32B 17/00–17/1099; C03C 3/076–3/118
See application file for complete search history.

(56) References Cited

U.S. PATENT DOCUMENTS

| 4,023,953 A | 5/1977 | Megles et al. |
| 4,214,886 A | 7/1980 | Shay et al. |

(Continued)

FOREIGN PATENT DOCUMENTS

| WO | 2013/016157 A1 | 1/2013 |
| WO | 2016/033038 A1 | 3/2016 |
| WO | 2017/079540 A1 | 5/2017 |

OTHER PUBLICATIONS

"Corning Gorilla Glass: Technical Materials", Corning, Incorporated, (2008); pp. 1-2.*

(Continued)

*Primary Examiner* — Prashant J Khatri
(74) *Attorney, Agent, or Firm* — Kevin M. Johnson; Kapil Banakar

(57) ABSTRACT

Scratch and damage resistant laminated glass articles are disclosed. According to one aspect, a laminated glass article may include a glass core layer formed from an ion exchangeable core glass composition and includes a core glass elastic modulus $E_C$ and at least one glass clad layer fused directly to the glass core layer. The at least one glass clad layer may be formed from an ion exchangeable clad glass composition different than the ion exchangeable core glass composition and includes a clad glass elastic modulus $E_{CL}$. The laminated glass article may have a total thickness T and the at least one glass clad layer may have a thickness $T_{CL}$ that is less than 30% of the total thickness T. $E_C$ may be at least 5% greater than $E_{CL}$.

25 Claims, 7 Drawing Sheets

(51) Int. Cl.
*C03B 17/06* (2006.01)
*C03C 21/00* (2006.01)

(52) U.S. Cl.
CPC ........ *C03C 21/002* (2013.01); *B32B 2250/40* (2013.01); *B32B 2307/558* (2013.01); *B32B 2307/584* (2013.01); *B32B 2315/08* (2013.01)

(56) References Cited

U.S. PATENT DOCUMENTS

| | | |
|---|---|---|
| 9,522,836 B2 | 12/2016 | Gulati et al. |
| 2009/0163342 A1 | 6/2009 | Kolberg et al. |
| 2011/0318555 A1 | 12/2011 | Bookbinder et al. |
| 2013/0224491 A1* | 8/2013 | Smedskjaer ............ C03C 3/091 501/67 |
| 2015/0140299 A1* | 5/2015 | Ellison .................... B32B 17/06 428/212 |
| 2015/0251383 A1 | 9/2015 | Beall et al. |
| 2017/0174564 A1 | 6/2017 | Cleary et al. |
| 2017/0282503 A1 | 10/2017 | Peng et al. |
| 2017/0341973 A1* | 11/2017 | Gross ...................... C03C 3/097 |
| 2018/0326704 A1 | 11/2018 | Harris et al. |

OTHER PUBLICATIONS

International Search Report and Written Opinion of the International Searching Authority; PCT/US20/023742; dated Jul. 21, 2020; 13 Pages; European Patent Office.

* cited by examiner

SCRATCH AND DAMAGE RESISTANT LAMINATED GLASS ARTICLES

This application claims the benefit of priority under 35 U.S.C. § 119 of U.S. Provisional Application Ser. No. 62/826,328 filed on Mar. 29, 2019, the content of which is relied upon and incorporated herein by reference in its entirety.

BACKGROUND

Field

The present specification generally relates to laminated glass articles and, more particularly, to laminated glass articles that are resistant to scratching and drop-induced damage.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage, such a scratching. Indeed, scratches introduced into the surface of the glass article may reduce the strength of the glass article as the scratches may serve as initiation points for cracks leading to catastrophic failure of the glass.

Moreover, such glass articles may also be incorporated in portable electronic devices, such as mobile telephones, personal media players, laptop computers and tablet computers. The glass articles incorporated in these devices may be susceptible to sharp impact damage during transport and/or use of the associated device. Sharp impact damage may include, for example, damage caused by dropping the device. Such damage may lead to failure of the glass.

Accordingly, a need exists for alternative glass articles that are both resistant to scratching and to drop-induced damage.

SUMMARY

According to a first aspect, a laminated glass article may include a glass core layer formed from an ion exchangeable core glass composition and includes a core glass elastic modulus $E_C$ and at least one glass clad layer fused directly to the glass core layer. The at least one glass clad layer may be formed from an ion exchangeable clad glass composition different than the ion exchangeable core glass composition and includes a clad glass elastic modulus $E_{CL}$. The laminated glass article may have a total thickness T and the at least one glass clad layer may have a thickness $T_{CL}$ that is less than 30% of the total thickness T. $E_C$ may be at least 5% greater than $E_{CL}$.

Another aspect includes a laminated glass article according to any of the forgoing aspects, wherein $E_{CL}$ is less than or equal to 76.5 GPa.

Another aspect includes a laminated glass article according to any of the forgoing aspects, wherein $E_{CL}$ is greater than or equal to 60 GPa.

Another aspect includes a laminated glass article according to any of the forgoing aspects, wherein a difference between $E_C$ and $E_{CL}$ is greater than or equal to 5 GPa.

Another aspect includes a laminated glass article according to any of the forgoing aspects, wherein the thickness $T_{CL}$ of the at least one glass clad layer is less than or equal to 5% of the total thickness T.

Another aspect includes a laminated glass article according to any of the forgoing aspects, wherein a core glass refractive index $n_C$ of the glass core layer is greater than a clad glass refractive index $n_u$ of the at least one glass clad layer.

Another aspect includes a laminated glass article according to any of the forgoing aspects, wherein the clad glass refractive index is greater than or equal to 1.45 and less than or equal to 1.55.

Another aspect includes a laminated glass article according to any of the forgoing aspects, wherein the at least one glass clad layer comprises a first glass clad layer and a second glass clad layer. The first glass clad layer may be fused directly to a first surface of the glass core layer and the second glass clad layer may be fused directly to a second surface of the glass core layer opposite the first surface of the glass core layer.

Another aspect includes a laminated glass article according to any of the forgoing aspects, wherein the glass core layer has a core coefficient of thermal expansion $CTE_C$ from 20° C. temperature to 300° C., the at least one glass clad layer has a clad coefficient of thermal expansion $CTE_{CL}$ from 20° C. to 300° C., and $CTE_C$ is greater than or equal to $CTE_{CL}$.

Another aspect includes a laminated glass article according to any of the forgoing aspects, wherein a compressive stress in the at least one glass clad layer due to a difference between $CTE_C$ and $CTE_{CL}$ is greater than 100 MPa and extends from a surface of the at least one glass clad layer through a thickness of the at least one glass clad layer.

Another aspect includes a laminated glass article according to any of the forgoing aspects, wherein the laminated glass article is ion exchange strengthened such that the laminated glass article comprises a compressive stress region extending from a surface of the at least one glass clad layer and into the total thickness T of the laminated glass article to a depth of compression DOC.

Another aspect includes a laminated glass article according to any of the forgoing aspects, wherein the laminated glass article has a surface compressive stress $CS_0$ at the surface of the at least one glass clad layer and the depth of compression DOC is greater than or equal to 10% of the total thickness T.

Another aspect includes a laminated glass article according to any of the foregoing aspects, wherein the glass core layer has a core coefficient of thermal expansion $CTE_C$ from 20° C. to 300° C. the at least one glass clad layer has a clad coefficient of thermal expansion $CTE_{CL}$ from 20° C. to 300° C.; and $CTE_C$ is greater than or equal to $CTE_{CL}$.

Another aspect includes a laminated glass article according to any of the forgoing aspects, wherein the laminated glass article has a Knoop scratch initiation threshold greater than or equal to 2 N and less than or equal to 8 N.

According to a second aspect, a laminated glass article may include a glass core layer formed from an ion exchangeable core glass composition and at least one glass clad layer fused directly to the glass core layer at an interface region. The at least one glass clad layer may be formed from an ion exchangeable clad glass composition different than the ion exchangeable core glass composition. The laminated glass article may have a total thickness T and the at least one glass clad layer may have a thickness $T_{CL}$ that is less than or equal to 30% of the total thickness T. The laminated glass article may be ion exchange strengthened such that the laminated glass article comprises a compressive stress region extending from a surface of the at least one glass clad layer into the total thickness T of the laminated glass article to a depth of compression DOC. A concentration of at least one of $K_2O$ and $Na_2O$ may decrease from a surface of the at least one glass clad layer to a clad side of the interface region. A concentration of at least one of $K_2O$ and $Na_2O$ may decrease from a core side of the interface region in a direction towards a centerline of the glass core layer. A concentration of at least one of $K_2O$ and $Na_2O$ is less at the clad side of the interface region than a concentration of the same constituent at the core side of the interface region.

Another aspect includes a laminated glass article according to the second aspect, wherein the at least one glass clad layer includes at least one glass former and a concentration of the at least one glass former is substantially constant from a surface of the at least one glass clad layer to a clad side of the interface region. The glass core layer may include at least one glass former and a concentration of the at least one glass former is substantially constant from a core side of the interface region to a middle region of the glass core layer.

Another aspect includes a laminated glass article according to the second aspect and any other aspects thereof, wherein the at least one glass clad layer includes at least one glass modifier and a concentration of the at least one glass modifier is substantially constant from a surface of the at least one glass clad layer to a clad side of the interface region. The glass core layer may include at least one glass modifier and a concentration of the at least one glass modifier is substantially constant from a core side of the interface region to a middle region of the glass core layer.

Another aspect includes a laminated glass article according to the second aspect and any other aspects thereof, wherein the glass core layer has a core coefficient of thermal expansion $CTE_C$ from 20° C. to 300° C., the at least one glass clad layer has a clad coefficient of thermal expansion $CTE_u$ from 20° C. to 300° C., and $CTE_C$ is greater than or equal to $CTE_{CL}$.

Another aspect includes a laminated glass article according to the second aspect and any other aspects thereof, wherein a compressive stress in the at least one glass clad layer due to a difference between $CTE_C$ and $CTE_u$ is greater than 100 MPa and extends from a surface of the at least one glass clad layer and through a thickness of the at least one glass clad layer.

Another aspect includes a laminated glass article according to the second aspect and any other aspects thereof, wherein the glass core layer comprises a core glass elastic modulus $E_C$ and the at least one glass clad layer comprises a clad glass elastic modulus $E_{CL}$, wherein $E_C$ is greater than $E_{CL}$.

Another aspect includes a laminated glass article according to the second aspect and any other aspects thereof, wherein a difference between $E_C$ and $E_{CL}$ is greater than or equal to 5 GPa.

Another aspect includes a laminated glass article according to the second aspect and any other aspects thereof, wherein a core glass refractive index $n_C$ of the glass core layer is greater than a clad glass refractive index $n_{CL}$ of the at least one glass clad layer.

Another aspect includes a laminated glass article according to the second aspect and any other aspects thereof, wherein the clad glass refractive index is greater than or equal to 1.45 and less than or equal to 1.55.

Another aspect includes a laminated glass article according to the second aspect and any other aspects thereof, wherein the DOC is greater than or equal to 10% of the total thickness T.

Another aspect includes a laminated glass article according to the second aspect and any other aspects thereof, wherein the thickness $T_{CL}$ is less than or equal to 10% of the total thickness T.

Additional features and advantages of the laminated glass articles described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
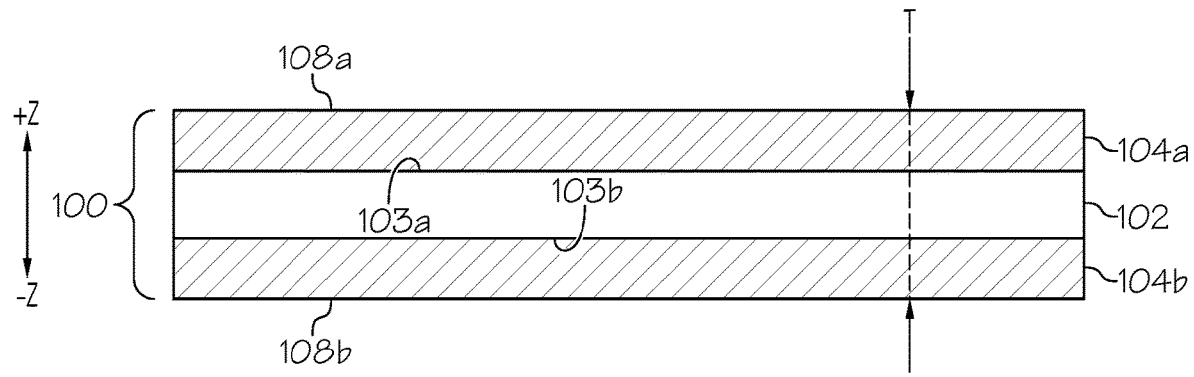
FIG. 1 schematically depicts a cross section of a laminated glass article according to one or more embodiments shown and described herein.

Reference will now be made in detail to embodiments of laminated glass articles, examples of which are illustrated in the accompanying drawings. Whenever possible, the same reference numerals will be used throughout the drawings to refer to the same or like parts. One embodiment of a laminated glass article is schematically depicted in cross section in FIG. 1, and is designated generally throughout by the reference numeral 100. The laminated glass article generally includes a glass core layer formed from an ion exchangeable core glass composition and includes a core glass elastic modulus $E_C$ and at least one glass clad layer fused directly to the glass core layer. The at least one glass clad layer may be formed from an ion exchangeable clad glass composition different than the ion exchangeable core glass composition and includes a clad glass elastic modulus $E_{CL}$. The laminated glass article may have a total thickness T and the at least one glass clad layer may have a thickness $T_{CL}$ that is less than 30% of the total thickness T. $E_C$ may be at least 5% greater than $E_{CL}$. Various embodiments of laminated glass articles and methods for forming the same will be described in further detail herein with specific reference to the claims.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The term "CTE," as used herein, refers to the coefficient of thermal expansion of the glass composition averaged over a temperature range from about 20° C. to about 300° C.

The elastic modulus (also referred to as Young's modulus) of different layers of the glass laminate is provided in units of gigapascals (GPa). The elastic modulus of the glass is determined by resonant ultrasound spectroscopy on bulk samples of each glass laminate composition.

The term "softening point," as used herein, refers to the temperature at which the viscosity of the glass composition is $1 \times 10^{7.6}$ poise.

The term "annealing point," as used herein, refers to the temperature at which the viscosity of the glass composition is $1 \times 10^{13}$ poise.

The terms "strain point" and "$T_{strain}$" as used herein, refers to the temperature at which the viscosity of the glass composition is $3 \times 10^{14}$ poise.

Surface compressive stress (CS) and depth of compression (DOC) were measured. using refractive near-field (PM) measurements as described in U.S. Pat. No. 8,854,623B2, entitled "Systems and methods for measuring a profile characteristic of a glass sample."

The phrase "depth of compression" and "DOC" refer to the position in the glass where compressive stress transitions to tensile stress.

Concentration profiles of various constituent components in the glass were measured by electron probe microanalysis (EPMA).

The embodiments described herein provide laminated glass articles which have high scratch resistance while also exhibiting improved resistance to drop-induced breakage. In particular, the embodiments described herein include laminated glass articles which include a glass clad layer and a glass core layer having dissimilar characteristics to facilitate different properties. Specifically, the glass clad layer has a high resistance to scratch and crack formation when subjected to sharp contacts while the glass core layer is amenable to ion exchange strengthening resulting in a deep depth of compression which improves resistance to drop-induced breakage. Further, the glasses for the glass clad layers and the glass core layer are selected to enable the development of stresses upon cool-down of the glasses following forming.

Referring now to FIG. 1, a laminated glass article 100 is schematically depicted in cross section. The laminated glass article 100 generally comprises a glass core layer 102 and at least one glass clad layer 104a. In the embodiment of the laminated glass article 100 shown in FIG. 1 the laminated glass article includes a first glass clad layer 104a and a second glass clad layer 104b positioned on opposite sides of the glass core layer 102. While FIG. 1 schematically depicts the laminated glass article 100 as being a laminated glass sheet, it should be understood that other configurations and form factors are contemplated and possible. For example, the laminated glass article may have a non-planar configuration such as a curved glass sheet or the like. Alternatively, the laminated glass article may be a laminated glass tube, container, or the like.

In the embodiment of the laminated glass articles 100 described herein, the glass core layer 102 generally comprises a first major surface 103a and a second major surface 103b which is opposed to the first major surface 103a. A first glass clad layer 104a is fused to the first major surface 103a of the glass core layer 102 and a second glass clad layer 104b is fused to the second major surface 103b of the glass core layer 102.

In the embodiments described herein, the glass clad layers 104a, 104b are fused to the glass core layer 102 without any additional non-glass materials, such as adhesives, coating layers or the like, being disposed between the glass core layer 102 and the glass clad layers 104a, 104b. Thus, in some embodiments, the glass clad layers 104a, 104b are fused directly to the glass core layer 102 or are directly adjacent to the glass core layer 102.

Figure 2:
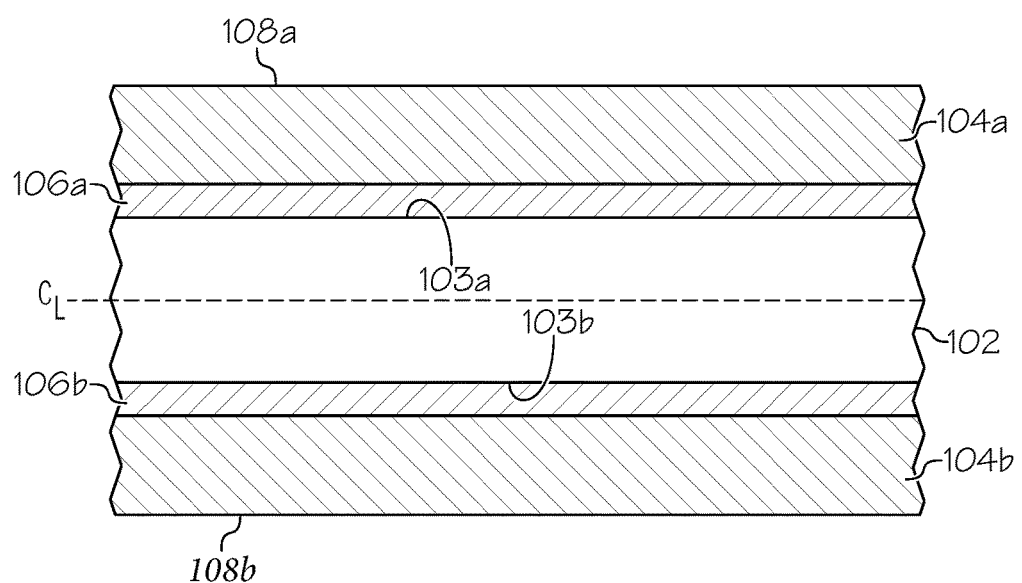
FIG. 2 schematically depicts an interface region of a laminated glass article according to one or more embodiments shown and described herein.

Referring now to FIG. 2, an enlarged view of the interface between the glass core layer 102 and the glass clad layers 104a, 104b is schematically depicted. In embodiments the laminated glass article 100 comprises interface regions 106a, 106b at the interface between the glass core layer 102 and the glass clad layers 104a, 104b. The interface regions 106a, 106b are formed when the glass core layer 102 and the glass clad layers 104a, 104b fuse together. The interface regions 106a, 106b are thin layers that consist of a mixture of the clad compositions forming the glass clad layers 104a, 104b and the core composition forming the glass core layer 102. For example, the interface regions 106a, 106b may comprise intermediate glass layers and/or diffusion layers formed at the interface of the glass core layer and the glass clad layer(s) (e.g., by diffusion of one or more components of the glass core and glass clad layers into the diffusion layer). In some embodiments, the laminated glass article 100 comprises a glass-glass laminate (e.g., an in situ fused multilayer glass-glass laminate) in which the interfaces between directly adjacent glass layers are glass-glass interfaces.

Referring again to FIG. 1, in the embodiments described herein, the laminated glass article 100 has a total thickness T which is the sum of the thickness of the glass core layer 102 and each of the glass clad layers 104a, 104b in the Z direction of the coordinate axes depicted in FIG. 1. In embodiments, the total thickness T of the laminated glass article may be greater than or equal to 0.5 mm and less than or equal to 3 mm. In some embodiments, the total thickness T of the laminated glass article may be greater than or equal to 0.8 mm and less than or equal to 1.5 mm. In some embodiments, the total thickness T of the laminated glass article may be greater than or equal to 0.9 mm and less than or equal to 1.0 mm.

In embodiments, each glass clad layer 104a, 104b has a thickness that is less than 30% of the total thickness T of the laminated glass article. In embodiments, the thickness of each glass clad layer 104a, 104b may be less than or equal to 25% of the total thickness T of the laminated glass article or even less than or equal to 20% of the total thickness T of the laminated glass article. In still other embodiments, the thickness of each glass clad layer 104a, 104b may be less than or equal to 15% of the total thickness T of the laminated glass article. In embodiments, each glass clad layer 104a, 104b has a thickness that is less than or equal to 10% of the total thickness T of the laminated glass article. In embodiments, the thickness of each glass clad layer 104a, 104b may be less than or equal to 8% of the total thickness T of the laminated glass article or even less than or equal to 6% of the total thickness T of the laminated glass article. In still other embodiments, the thickness of each glass clad layer 104a, 104b may be less than or equal to 5% of the total thickness T of the laminated glass article. Glass clad layers having a thickness of less than 30% of the total thickness T of the laminated glass article assists in ion exchange strengthening the glass core layer 102 through the glass clad layers 104a, 104b.

In the embodiments of the laminated glass articles 100 described herein, the glass core layer 102 is formed from an ion exchangeable core glass composition and the glass clad layers 104a, 104b are formed from an ion exchangeable clad glass composition. However, the composition of the glass clad layers 104a, 104b is different than the composition of the glass core layer 102 in order to achieve specific attributes in the final laminated glass article.

For example, the glass core layer 102 and the glass clad layers 104a, 104b may have different free volumes which, in turn, results in the glass core layer 102 and the glass clad layers 104a, 104b having different properties. The phrase "free volume," as used herein, refers to the space in the glass structure not occupied by atoms or structural units. Specifically, the glass clad layers 104a, 104b may have a relatively high free volume compared to the glass core layer 102. A relatively high free volume in the glass clad layers 104a, 104b results in densification of the glass during sharp impact events (i.e., scratches) and less shear which, in turn, results in less subsurface damage in the glass and less residual stress in the glass. However, a relatively high free volume in the glass does not necessarily result in improved resistance to drop-induced damage. This is because glasses with relatively high free volume generally have lower surface compression after ion exchange strengthening than glasses with relatively low free volume.

Accordingly, in the embodiments described herein, the glass core layer 102 has a lower free volume than the glass clad layers 104a, 104b. The relatively low free volume of the glass core layer 102 facilitates achieving higher compressive stresses in the glass core layer 102 when the glass core layer 102 is strengthened by ion exchange. The compressive stress in the glass core layer 102, such as at the edges of the glass core layer, improves the resistance of the laminated glass article 100 to drop-induced damage.

Based on the foregoing, a laminated glass article 100 with both improved resistance to scratching and improved resistance to drop-induced damage can be achieved by utilizing glasses with relatively high free volumes for the glass clad layers 104a, 104b and a glass with relatively lower free volume for the glass core layer 102.

The free volume of a glass is related to the elastic modulus of the glass. In particular, it is generally understood that the elastic modulus of the glass decreases with increasing free volume and increases with decreasing free volume. Accordingly, in the embodiments described herein, the glass core layer 102 has an elastic modulus $E_C$ that is greater than the elastic moduli $E_{CL}$ of the glass clad layers 104a, 104b. In some embodiments, the elastic modulus $E_C$ of the glass core layer 102 is at least 5% greater than the elastic moduli $E_{CL}$ of the glass clad layers 104a, 104b. For example, in some embodiments, the elastic modulus $E_C$ of the glass core layer 102 is at least 10% greater than the elastic moduli $E_{CL}$ of the glass clad layers 104a, 104b or even at least 15% greater than the elastic moduli $E_{CL}$ of the glass clad layers 104a, 104b. In still other embodiments, the elastic modulus $E_C$ of the glass core layer 102 is at least 20% greater than the elastic moduli $E_{CL}$ of the glass clad layers 104a, 104b or even at least 25% greater than the elastic moduli $E_{CL}$ of the glass clad layers 104a, 104b.

In some embodiments, a difference between the elastic modulus $E_C$ of the glass core layer 102 and the elastic moduli $E_{CL}$ of the glass clad layers 104a, 104b is greater than or equal to 5 GPa or even greater than or equal to 10 GPa. For example, in some of these embodiments, a difference between the elastic modulus $E_C$ of the glass core layer 102 and the elastic moduli $E_{CL}$ of the glass clad layers 104a, 104b is greater than or equal to 15 GPa or even greater than or equal to 20 GPa. In yet other embodiments, a difference between the elastic modulus $E_C$ of the glass core layer 102 and the elastic moduli $E_{CL}$ of the glass clad layers 104a, 104b is greater than or equal to 25 GPa or even greater than or equal to 30 GPa.

In some embodiments, the elastic moduli $E_{CL}$ of the glass clad layers 104a, 104b is less than or equal to 76.5 GPa and the elastic moduli $E_C$ of the glass core layer 102 is greater than 76.5 GPa. For example, in some embodiments, the elastic moduli $E_{CL}$ of the glass clad layers 104a, 104b is less than or equal to 76.5 GPa and greater than or equal to 60 GPa and the elastic moduli $E_C$ of the glass core layer 102 is greater than 76.5 GPa and less than or equal to 90 GPa. In some embodiments, the elastic moduli $E_{CL}$ of the glass clad layers 104a, 104b is less than or equal to 71.5 GPa and the elastic moduli $E_C$ of the glass core layer 102 is greater than 76.5 GPa.

Like elastic modulus, the free volume of the glass is also related to the refractive index n of the glass. In the embodiments described herein, the glass core layer 102 has a core refractive index $n_C$ that is greater than the clad refractive index $n_{CL}$ of the glass clad layers 104a, 104b. For example, in embodiments, the clad refractive index $n_{CL}$ is greater than or equal to 1.45 and less than or equal to 1.55 or even greater than or equal to 1.48 and less than or equal to 1.505. In these embodiments, the core refractive index $n_C$ is greater than or equal to 1.50 and less than or equal to 1.60 or even greater than or equal to 1.506 and less than or equal to 1.55.

As noted hereinabove, the glass core layer 102 and the glass clad layers 104a, 104b are formed from glass compositions which can be strengthened by ion exchange. The presence of alkali oxides in the glass core layer 102 and the glass clad layers 104a, 104b facilitate strengthening the glass by ion exchange. Specifically, alkali ions, such as potassium ions, sodium ions, lithium ions and the like, are sufficiently mobile in the glass to facilitate ion exchange. Strengthening of the laminated glass article by ion exchange may be accomplished by treating the laminated glass article 100 in a salt bath of molten $KNO_3$, molten $NaNO_3$, or combinations thereof at temperatures from 350° C. to 500° C. for a time period of less than about 30 hours or even about less than 20 hours.

In embodiments where the laminated glass article 100 is strengthened by ion exchange, the laminated glass articles have a surface compressive stress $CS_0$ and a compressive stress region that extends from the surfaces 108a, 108b of the laminated glass article 100 and into the total thickness T to a depth of compression DOC. In some of these embodiments, the surface compressive stress is greater than or equal to 200 MPa or even greater than or equal to 500 MPa. In some of these embodiments, the surface compressive stress may be greater than or equal to 600 MPa or even greater than or equal to 700 MPa.

In the embodiments described herein, the laminated glass article includes a compressive stress region extending from a surface of the at least one glass clad layer and into the total thickness T of the laminated glass article to a depth of compression. In some embodiments, the depth of compression of the compressive stress region may be greater than or equal to 10% of the total thickness T of the laminated glass article 100. In some embodiments, the depth of compression of the compressive stress region may be greater than or equal to 15% of the total thickness T of the laminated glass article 100 or even greater than or equal to 20% of the total thickness T of the laminated glass article 100. In still other embodiments, the depth of compression of the compressive stress region may be greater than or equal to 25% of the total thickness T of the laminated glass article 100 or even greater than or equal to 30% of the total thickness T of the laminated glass article 100.

As noted hereinabove, the laminated glass article 100 is constructed such that the glass core layer 102 can be ion exchange strengthened through the glass clad layers 104a, 104b. In addition, the laminated glass article 100 is constructed such that the glass core layer 102 has a lower free volume (i.e., a greater elastic modulus and greater index of refraction) than the glass clad layers 104a, 104b. The glass core layer 102 and the glass clad layers 104a, 104b have different compositional characteristics to achieve these properties. The compositional characteristics of each glass composition produces a unique alkali ion diffusion profile through the thickness of the laminated glass article after strengthening by ion exchange.

Referring again to FIG. 2, prior to ion exchange strengthening, the concentration of various constituent components of the glass network (e.g., glass formers such as $SiO_2$ and $B_2O_3$, intermediates such as $Al_2O_3$, and modifiers such as CaO, $Na_2O$, etc.) of the glass clad layers 104a, 104b are generally uniformly distributed from the surfaces 108a, 108b of the laminated glass article 100 to the respective interface regions 106a, 106b. For example, the glass clad layers 104a, 104b comprise at least one glass former and a concentration of the glass former is substantially constant from the surfaces 108a, 108b of the laminated glass article 100 to the clad side of the interface regions 106a, 106b. In addition, the glass clad layers 104a, 104b comprise at least one modifier, such as $Na_2O$ and/or another alkali oxide, and a concentration of the modifier is substantially constant from the surfaces 108a, 108b of the laminated glass article 100 to the clad side of the interface regions 106a, 106b.

Similarly, the concentration of various constituent components of the glass network (e.g., glass formers such as $SiO_2$ and $B_2O_3$, intermediates such as $Al_2O_3$, and modifiers such as CaO, $Na_2O$, etc.) of the glass core layer 102 are generally uniformly distributed from the respective interface regions 106a, 106b to the centerline $C_L$ of the glass core layer 102. For example, the glass core layer 102 comprises at least one glass former and a concentration of the glass former is substantially constant from a core side of the interface region to the centerline $C_L$ of the glass core layer 102. In addition, the glass core layer 102 comprises at least one modifier, such as $Na_2O$ and/or another alkali oxide, and a concentration of the glass modifier is substantially constant from a core side of the interface region to the centerline $C_L$ of the glass core layer 102.

However, after ion exchange, the concentration of the alkali oxides, such as $K_2O$ and/or $Na_2O$, varies in both the glass core layer 102 and the glass clad layers 104a, 104b as a function of depth from the surfaces 108a, 108b of the laminated glass article 100. Specifically, a concentration of at least one of $K_2O$ and $Na_2O$ decreases from the surfaces 108a, 108b of the laminated glass article 100, through the glass clad layers 104a, 104b, to a clad side of the interface regions 106a, 106b. That is, the concentration of $Na_2O$ and/or $K_2O$ in the glass clad layers 104a, 104b as a function of distance from the surfaces 108a, 108b has a negative slope. For example, in some embodiments, the slope of the $Na_2O$ concentration in the glass clad layers 104a, 104b may be from about −5 mol. %/μm to about −18 mol. %/μm while the slope of the $K_2O$ concentration in the glass clad layers 104a, 104b may be from about −3 mol. %/μm to about −12 mol. %/μm.

Similarly, the concentration of at least one of $K_2O$ and $Na_2O$ decreases from a core side of the interface regions 106a, 106b in the direction of the centerline $C_L$ of the glass core layer 102. However, in the embodiments described herein, the concentration of at least one of $K_2O$ and $Na_2O$ is less at the clad side of the interface regions 106a, 106b than the concentration of the same constituent component at the core side of the interface region 106a, 106b.

While the concentration of alkali oxides in the glass clad layers changes as a result of ion exchange strengthening, it should be understood that the concentrations of the other constituents of the glass network (i.e., glass formers, intermediates, and non-mobile modifiers such as alkaline earth oxides (CaO, MgO, etc.)) remain substantially the same (i.e., substantially uniform through the thicknesses of the glass clad layers and substantially uniform through the thickness of the glass core layer).

In embodiments where the laminated glass article is separated from a continuous ribbon of glass, the separation may expose the glass core layer and the central tension in the glass core layer along at least one edge of the laminated glass article, as noted hereinabove. In embodiments where the laminated glass article comprises a glass core layer formed from an ion exchangeable glass, the exposed edge of the laminated glass article with the exposed central tension may be ion exchange strengthened to produce compressive stress in the surface of the exposed glass core layer extending to a depth of compression. The surface compressive stress in the exposed glass core layer eliminates the central tension at the exposed edge and reduces the risk of failure of the laminated glass article from the exposed edge. In these embodiments, the laminated glass article may have surface compressive stresses along the entire exposed edge (i.e., in the glass clad layers and the glass core layer).

Referring again to FIG. 1, in some embodiments, the laminated glass article 100 may be formed such that there is a mismatch between the coefficients of thermal expansion (CTE) of the glass core layer 102 and the glass clad layers 104a, 104b. This mismatch in the CTEs of the glass core layer 102 and the glass clad layers 104a, 104b results in the formation of compressive stress extending from the surfaces 108a, 108b of the laminated glass article 100 into the thickness of laminated glass article. For example, in some embodiments described herein, the glass clad layers 104a, 104b are formed from glass compositions which have an average clad coefficient of thermal expansion $CTE_{CL}$ and the glass core layer 102 is formed from a different glass composition which has an average core coefficient of thermal expansion $CTE_C$. $CTE_C$ is greater than $CTE_{CL}$ (i.e., $CTE_C > CTE_{CL}$) which results in the glass clad layers 104a, 104b being compressively stressed.

The compressive stress in the clad due to the CTE differential between the core and the clad may be approximated with the following equations:

$$\frac{\sigma_{clad}}{\sigma_{core}} = -\left(\frac{t_{core}}{2t_{clad}}\right) = -k;$$

$$\sigma_{clad} = \frac{(\alpha_{clad} - \alpha_{core})\Delta T}{\frac{1}{kE_{core}^{eff}} + \frac{1}{E_{clad}^{eff}} - \Delta T\left(\frac{\alpha_{core}}{kE_{core}^{eff}} + \frac{\alpha_{clad}}{E_{clad}^{eff}}\right)};$$

$$E_{core}^{eff} = \frac{E_{core}}{(1+v_{core})(1-2v_{core})};$$

$$E_{core}^{eff} = \frac{E_{clad}}{(1+v_{clad})(1-2v_{clad})};$$

Where $t_{core}$ is the core thickness, $t_{clad}$ is the clad thickness, $\alpha_{clad}$ is the clad coefficient of thermal expansion, $\alpha_{core}$ is the core coefficient of thermal expansion, $\Delta T$ is the effective temperature difference, $E_{core}$ is the elastic modulus of the core, $E_{clad}$ is the elastic modulus of the clad, $v_{core}$ is the Poisson's ratio of the core and $v_{clad}$ is the Poisson's ratio of the clad. In general $\alpha_{clad}\ll\Delta T$ and $\alpha_{core}\Delta T\ll 1$, hence:

$$\sigma_{clad} \approx \frac{(\alpha_{clad} - \alpha_{core})\Delta T}{\frac{1}{kE_{core}^{eff}} + \frac{1}{E_{clad}^{eff}}}.$$

For example, in some embodiments, the glass clad layers are formed from glass compositions which have an average clad $CTE_{CL}$ less than or equal to about $72\times10^{-7}/°$ C. averaged over a range from 20° C. to 300° C. In some embodiments, the average clad $CTE_{CL}$ of the clad glass compositions may be less than or equal to about $70\times10^{-7}/°$ C. averaged over a range from 20° C. to 300° C. In yet other embodiments, the average clad $CTE_{CL}$ of the clad glass compositions may be less than or equal to about $65\times10^{-7}/°$ C. averaged over a range from 20° C. to 300° C. In still other embodiments, the average clad $CTE_{CL}$ of the clad glass compositions may be less than or equal to about $60\times10^{-7}/°$ C. averaged over a range from 20° C. to 300° C. or even less than or equal to about $55\times10^{-7}/°$ C. averaged over a range from 20° C. to 300° C.

However, the glass core layer may be formed from glass compositions which have an average coefficient of thermal expansion greater than $72\times10^{-7}/°$ C. in a range from 20° C. to 300° C. In some of these embodiments, the average core $CTE_C$ of the core glass composition of the glass core layer may be greater than or equal to about $75\times10^{-7}/°$ C. in a range from 20° C. to 300° C. In yet other embodiments, the average core $CTE_C$ of the glass composition of the glass core layer may be greater than or equal to about $80\times10^{-7}/°$ C. averaged over a range from 20° C. to 300° C. In yet other embodiments, the average core $CTE_C$ of the glass composition of the glass core layer may be greater than or equal to about $90\times10^{-7}/°$ C. averaged over a range from 20° C. to 300° C.

In the embodiments described herein, the CTE differential between the glass core layer 102 and the glass clad layers 104a, 104b (i.e., $|CTE_C-CTE_{CL}|$) is sufficient to generate a compressive stress in the clad layers. In some embodiments, the CTE differential between the glass core layer 102 and the glass clad layers 104a, 104b is sufficient to create a compressive stress in the glass clad layers 104a, 104b of greater than or equal to 100 MPa which extends from a surface of the glass clad layer 104a, 104b and through the thickness of the glass clad layers 104a, 104b. In some embodiments, the compressive stress in the glass clad layers 104a, 104b due to the CTE differential is greater than or equal to 120 MPa or even greater than or equal to 150 MPa.

In some embodiments the CTE differential between the glass core layer and the glass clad layers is greater than or equal to about $5\times10^{-7}/°$ C. or even $10\times10^{-7}/°$ C. In some other embodiments, the CTE differential between the glass core layer and the glass clad layers is greater than or equal to about $20\times10^{-7}/°$ C. or even $30\times10^{-7}/°$ C. In yet other embodiments, the CTE differential between the glass core layer and the glass clad layers is greater than or equal to about $40\times10^{-7}/°$ C. or even $50\times10^{-7}/°$ C.

Figure 8:
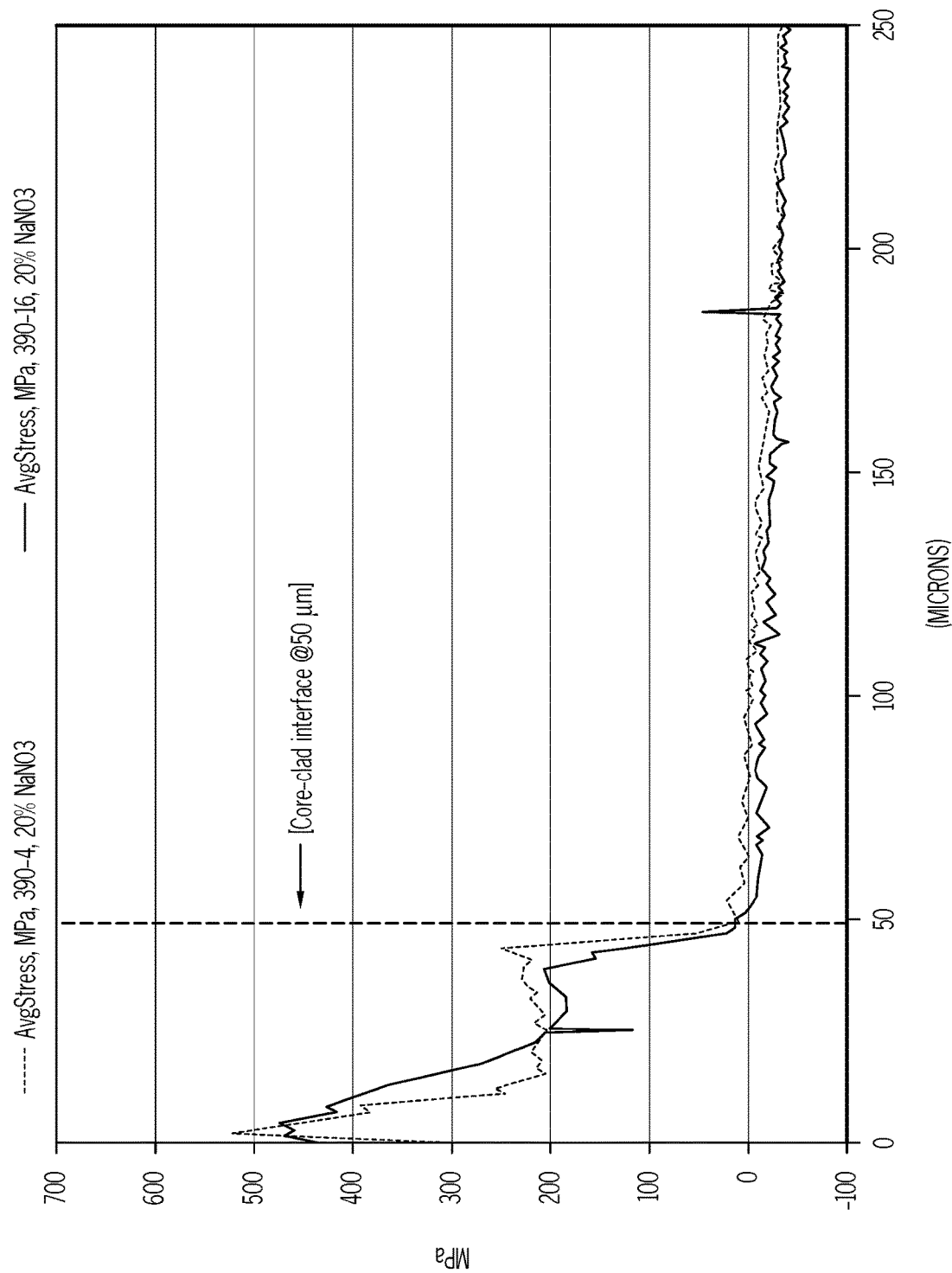
FIG. 8 graphically depicts compressive stress (Y-ordinate) as a function of depth (X-ordinate) for ion exchanged samples of the laminated glass articles.

In embodiments where the laminated glass article 100 is formed from core glass compositions and clad glass compositions having a CTE differential which produces a compressive stress extending through the thickness of the glass clad layers 104a, 104b, the laminated glass article 100 may also be strengthened by ion exchange to further enhance the properties of the laminated glass article 100. The combination of a CTE differential between the glass core layer 102 and the glass clad layers 104a, 104b and ion exchange strengthening creates a unique stress profile, an example of which is graphically depicted in FIG. 8. As shown in FIG. 8, the compressive stress in the glass clad layer (region "a") has a profile that is the sum of the stress profile due to the CTE differential between the glass clad layer and the glass core layer and the stress profile due to ion exchange. The compressive stress in the region from the surface of the glass up to the core-clad interface at 50 μm includes both compressive stresses due to the CTE differential between the glass core layer and the glass clad layer as well as compressive stresses due to ion exchange strengthening. The glass core layer (i.e., the portion of the laminate at depths greater than 50 μm) is also compressively stressed. However, the stresses in the glass core layer are due to ion exchange strengthening the glass clad layer through the glass core layer.

In some embodiments, the glass core layer may be formed from one of the ion exchangeable core glass compositions listed in Table 1A and Table 1B below. However, it should be understood that other compositions for the glass core layer 102 are contemplated and possible.

TABLE 1A

Example Glass Core Layer Compositions

| Analyzed composition in mol % | C1 | C2 | C3 | C4 | C5 | C6 | C7 |
|---|---|---|---|---|---|---|---|
| $SiO_2$ | 61.39 | 61.34 | 61.38 | 61.44 | 61.24 | 61.34 | 61.29 |
| $Al_2O_3$ | 16.33 | 16.26 | 16.29 | 16.26 | 16.32 | 16.34 | 16.31 |
| $B_2O_3$ | 0.00 | 1.46 | 0.96 | 0.56 | 0.00 | 1.16 | 0.00 |
| $P_2O_5$ | 2.92 | 0.00 | 0.00 | 0.00 | 0.00 | 0.00 | 0.00 |
| $Li_2O$ | 8.31 | 8.40 | 8.33 | 8.22 | 8.32 | 8.35 | 8.31 |
| $Na_2O$ | 11.00 | 8.95 | 8.96 | 9.01 | 9.03 | 9.00 | 9.01 |
| MgO | 0.00 | 3.54 | 4.03 | 4.46 | 5.04 | 3.53 | 4.80 |
| $ZrO_2$ | 0.00 | 0.00 | 0.00 | 0.00 | 0.00 | 0.23 | 0.23 |
| $SnO_2$ | 0.05 | 0.05 | 0.05 | 0.05 | 0.05 | 0.05 | 0.05 |
| Density (g/cm³) | 2.42 | 2.442 | 2.448 | 2.451 | 2.46 | 2.45 | 2.465 |
| FE Strain Pt. (° C.) | 565 | 545 | 548 | 552 | 558 | 550 | 563 |
| FE Anneal Pt. (° C.) | 614 | 595 | 594 | 598 | 604 | 597 | 610 |
| FE Softening Pt. (° C.) | 855 | 813.8 | | 821 | | 823 | 829.2 |
| CTE * $10^{-7}$ (1/° C.) | 84.9 | 75.9 | 75.8 | 75.4 | 75.8 | 76 | 75.1 |
| liquidus visc Air (Poise) | 405172 | 73576 | 64692 | 45793 | 23978 | 57235 | 39445 |
| liquidus visc Int (Poise) | 405172 | 73576 | 70986 | 54805 | 28463 | 62764 | 47317 |
| liquidus visc Pt (Poise) | 450632 | 98103 | 85719 | 65831 | 40554 | 75696 | 62631 |
| Stress Optical Coefficient (nm/mm/MPa) | 2.922 | 2.878 | 2.828 | 2.797 | 2.763 | 2.86 | 2.782 |
| Refractive Index | 1.5063 | 1.5167 | 1.5175 | 1.5186 | 1.5199 | 1.518 | 1.5208 |
| Elastic Modulus (GPa) | 76.7 | 81.3 | 82.6 | 82.8 | 83.6 | 82.3 | 84.0 |
| Poisson's Ratio | 0.211 | 0.21 | 0.22 | 0.22 | 0.22 | 0.22 | 0.22 |

TABLE 1B

Example Glass Core Layer Compositions

| Analyzed composition mol % | C8 | C9 | C10 | C11 | C12 | C13 |
|---|---|---|---|---|---|---|
| $SiO_2$ | 60.32 | 59.80 | 60.49 | 59.77 | 60.35 | 59.79 |
| $Al_2O_3$ | 16.40 | 16.34 | 16.28 | 16.34 | 16.36 | 16.32 |
| $B_2O_3$ | 1.47 | 1.46 | 0.98 | 0.97 | 0.49 | 0.49 |
| $P_2O_5$ | 0.99 | 1.49 | 0.98 | 1.49 | 0.99 | 1.48 |
| $Li_2O$ | 8.29 | 8.43 | 8.31 | 8.41 | 8.31 | 8.34 |
| $Na_2O$ | 8.94 | 8.91 | 8.94 | 8.91 | 8.95 | 8.97 |
| MgO | 3.53 | 3.53 | 3.97 | 4.06 | 4.50 | 4.56 |
| $SnO_2$ | 0.06 | 0.05 | 0.05 | 0.05 | 0.06 | 0.05 |
| Density (g/cm³) | 2.438 | 2.436 | 2.444 | 2.443 | 2.45 | 2.449 |
| FE Strain Pt. (° C.) | 546 | 557 | 551 | 565 | 563 | 573 |
| FE Anneal Pt. (° C.) | 591 | 604 | 597 | 611 | 609 | 619 |
| FE Softening Pt. (° C.) | 861 | 859 | 864 | 858 | 851 | 864 |
| CTE * $10^{-7}$ (1/° C.) | 78.6 | 79.2 | 78.6 | 79.8 | 78.4 | 79 |
| Stress Optical Coefficient (nm/mm/MPa) | 2.891 | 2.919 | 2.866 | 2.874 | 2.833 | 2.861 |
| Refractive Index | 1.5149 | 1.5149 | 1.5164 | 1.5148 | 1.5169 | 1.5157 |
| Elastic Modulus (GPa) | 80.53 | 80.32 | 81.56 | 81.01 | 82.46 | 82.05 |
| Poisson's Ratio | 0.218 | 0.224 | 0.225 | 0.226 | 0.226 | 0.224 |

In some embodiments, the glass clad layers may be formed from one or more of the ion exchangeable clad glass compositions listed in Table 2A and Table 2B below. However, it should be understood that other compositions for the glass clad layers 104a, 104b are contemplated and possible.

TABLE 2A

Example Clad Glass Compositions

| Analyzed composition in mol % | CL1 | CL2 | CL3 | CL4 | CL5 | CL6 |
|---|---|---|---|---|---|---|
| $SiO_2$ | 73.56 | 60.26 | 64.31 | 62.40 | 66.21 | 68.22 |
| $Al_2O_3$ | 7.51 | 15.22 | 13.25 | 14.25 | 12.22 | 11.23 |
| $B_2O_3$ | 6.72 | 9.78 | 9.73 | 9.72 | 9.74 | 9.69 |
| $P_2O_5$ | 2.45 | 0.00 | 0.00 | 0.00 | 0.00 | 0.00 |
| $Li_2O$ | 5.88 | 5.79 | 3.81 | 5.69 | 3.86 | 3.87 |
| $Na_2O$ | 3.83 | 8.90 | 8.86 | 7.90 | 7.92 | 6.94 |
| MgO | 0.00 | 0.00 | 0.00 | 0.00 | 0.00 | 0.00 |
| $ZrO_2$ | 0.00 | 0.00 | 0.00 | 0.00 | 0.00 | 0.00 |
| $SnO_2$ | 0.05 | 0.05 | 0.05 | 0.05 | 0.05 | 0.05 |
| Density (g/cm$^3$) | 2.281 | 2.358 | 2.338 | 2.346 | 2.326 | 2.312 |
| FE Strain Pt. (° C.) | 498 | 512 | 521 | 513 | 516 | 514 |
| FE Anneal Pt. (° C.) | 545 | 559 | 571 | 571 | 561 | 566 |
| FE Softening Pt. (° C.) | 825.2 | 809.6 | 833.3 | 818.9 | 834.5 | 845.1 |
| CTE * $10^{-7}$ (1/° C.) | 49.6 | 70.3 | 64.8 | 66.3 | 62.5 | 58.4 |
| liquidus visc Air (Poise) | 202940 | 386760 | 9359791 | 415386 | 10843312 | 7819746 |
| liquidus visc Int (Poise) | 220335 | 386760 | 10695950 | 460429 | 12292910 | 7819746 |
| liquidus visc Pt (Poise) | 283326 | 601919 | 10695950 | 460429 | 9576418 | 8799692 |
| Stress Optical Coefficient (nm/mm/MPa) | 3.579 | 3.398 | 3.523 | 3.444 | 3.571 | 3.617 |
| Refractive Index | 1.4844 | 1.5042 | 1.4965 | 1.5009 | 1.4945 | 1.4924 |
| Elastic Modulus (GPa) | 67.8 | 69.6 | 67.1 | 69.3 | 67.1 | 66.5 |
| Poisson's Ratio | 0.201 | 0.226 | 0.22 | 0.219 | 0.223 | 0.219 |

TABLE 2B

Example Clad Glass Compositions

| Analyzed composition in mol % | CL7 | CL8 | CL9 | CL10 | CL11 | CL12 | CL13 |
|---|---|---|---|---|---|---|---|
| $SiO_2$ | 70.20 | 66.37 | 66.42 | 66.40 | 66.48 | 66.42 | 66.50 |
| $Al_2O_3$ | 10.22 | 12.57 | 12.56 | 12.57 | 12.57 | 12.54 | 12.59 |
| $B_2O_3$ | 9.71 | 7.23 | 7.19 | 7.19 | 7.15 | 7.17 | 7.08 |
| $P_2O_5$ | 0.00 | 0.00 | 0.00 | 0.00 | 0.00 | 0.00 | 0.00 |
| $Li_2O$ | 3.82 | 6.84 | 6.83 | 6.83 | 6.74 | 6.84 | 6.74 |
| $Na_2O$ | 6.00 | 5.36 | 4.85 | 4.37 | 3.89 | 3.39 | 2.90 |
| MgO | 0.00 | 1.58 | 2.10 | 2.60 | 3.11 | 3.59 | 4.15 |
| $ZrO_2$ | 0.00 | 0.00 | 0.00 | 0.00 | 0.00 | 0.00 | 0.00 |
| $SnO_2$ | 0.05 | 0.05 | 0.05 | 0.05 | 0.05 | 0.05 | 0.05 |
| Density (g/cm$^3$) | 2.297 | 2.349 | 2.349 | 2.35 | 2.35 | 2.352 | 2.353 |
| FE Strain Pt. (° C.) | 514 | 523 | 532 | 543 | 542 | 548 | 556 |
| FE Anneal Pt. (° C.) | 568 | 567 | 577 | 590 | 590 | 596 | 604 |
| FE Softening Pt. (° C.) | 855.8 | 815.2 | 828.3 | 832 | 832 | 837 | 843.1 |
| CTE * $10^{-7}$ (1/° C.) | 54.2 | 58.1 | 55.5 | 54 | 51.3 | 49.9 | 48.2 |
| liquidus visc Air (Poise) | 11457230 | 120189 | 86244 | 60763 | 78774 | 54016 | 52905 |
| liquidus visc Int (Poise) | 10112360 | 131666 | 113084 | 78900 | 94495 | 70575 | 68985 |
| liquidus visc Pt (Poise) | 12998844 | 158438 | 123998 | 94303 | 113768 | 84730 | 99542 |
| Stress Optical Coefficient (nm/mm/MPa) | 3.703 | 3.322 | 3.312 | 3.305 | 3.289 | 3.288 | 3.261 |
| Refractive Index | 1.4902 | 1.5025 | 1.5029 | 1.5035 | 1.504 | 1.5048 | 1.5054 |
| Elastic Modulus (GPa) | 65.8 | 73.2 | 73.6 | 74.2 | 74.5 | 75.3 | 76.3 |

TABLE 2B-continued

Example Clad Glass Compositions

| Analyzed composition in mol % | CL7 | CL8 | CL9 | CL10 | CL11 | CL12 | CL13 |
|---|---|---|---|---|---|---|---|
| Poisson's Ratio | 0.214 | 0.214 | 0.213 | 0.214 | 0.214 | 0.215 | 0.219 |

A variety of processes may be used to produce the laminated glass articles described herein including, without limitation, lamination slot draw processes, lamination float processes, or fusion lamination processes. Each of these lamination processes generally involves flowing a first molten glass composition, flowing a second molten glass composition, and contacting the first molten glass composition with the second molten glass composition at a temperature greater than the glass transition temperature of either glass composition to form an interface between the two compositions such that the first and second molten glass compositions fuse together at the interface as the glass cools and solidifies.

Figure 3:
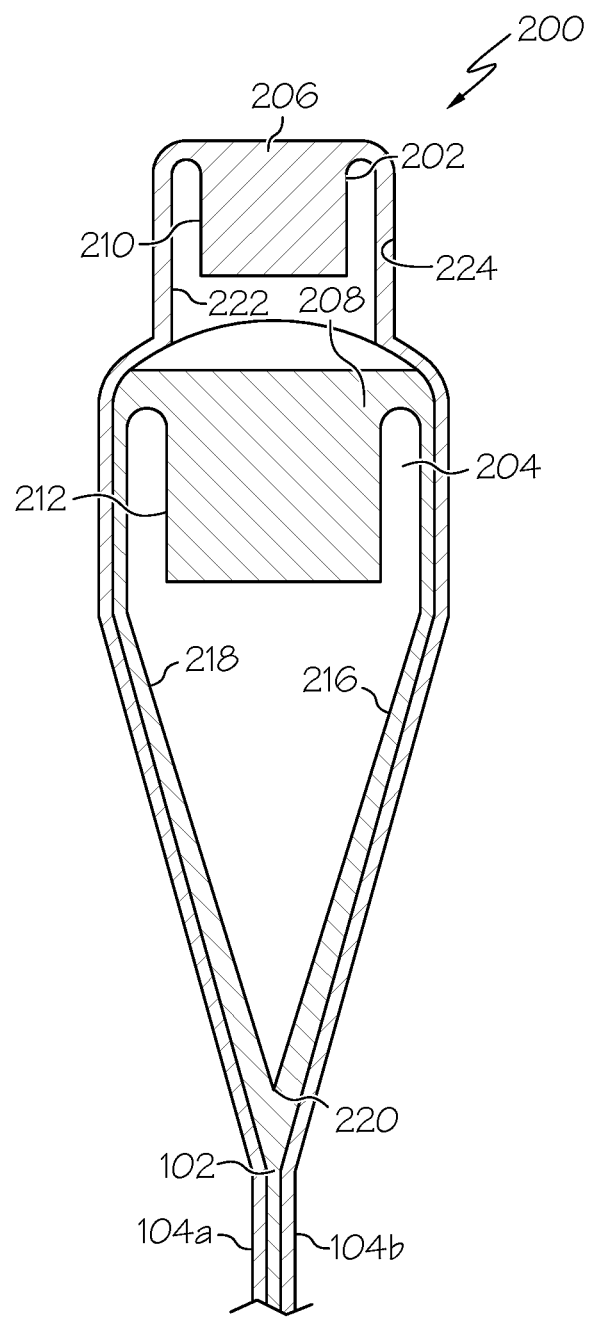
FIG. 3 schematically depicts an apparatus for forming a laminated glass article according to one or more embodiments shown and described herein.

In one particular embodiment, the laminated glass articles 100 described herein may be formed by a fusion lamination process such as the process described in U.S. Pat. No. 4,214,886, which is incorporated herein by reference. Referring to FIG. 3 by way of example, a laminate fusion draw apparatus 200 for forming a laminated glass article includes an upper overflow distributor or isopipe 202 which is positioned over a lower overflow distributor or isopipe 204. The upper overflow distributor 202 includes a trough 210 into which a molten glass clad composition 206 is fed from a melter (not shown). Similarly, the lower overflow distributor 204 includes a trough 212 into which a molten glass core composition 208 is fed from a melter (not shown).

As the molten glass core composition 208 fills the trough 212, it overflows the trough 212 and flows over the outer forming surfaces 216, 218 of the lower overflow distributor 204. The outer forming surfaces 216, 218 of the lower overflow distributor 204 converge at a root 220. Accordingly, the molten glass core composition 208 flowing over the outer forming surfaces 216, 218 rejoins at the root 220 of the lower overflow distributor 204 thereby forming a glass core layer 102 of a laminated glass article.

Simultaneously, the molten glass clad composition 206 overflows the trough 210 formed in the upper overflow distributor 202 and flows over outer forming surfaces 222, 224 of the upper overflow distributor 202. The molten glass clad composition 206 is outwardly deflected by the upper overflow distributor 202 such that the molten glass clad composition 206 flows around the lower overflow distributor 204 and contacts the molten glass core composition 208 flowing over the outer forming surfaces 216, 218 of the lower overflow distributor, fusing to the molten glass core composition and forming glass clad layers 104a, 104b around the glass core layer 102.

While FIG. 3 schematically depicts a particular apparatus for forming planar laminated glass articles such as sheets or ribbons, it should be appreciated that other geometrical configurations are possible. For example, cylindrical laminated glass articles may be formed, for example, using the apparatuses and methods described in U.S. Pat. No. 4,023, 953.

In some embodiments, the molten glass core composition 208 generally has an average core coefficient of thermal expansion $CTE_C$ which is greater than the average clad coefficient of thermal expansion $CTE_{CL}$ of the molten glass clad composition 206, as described herein above. Accordingly, as the glass core layer 102 and the glass clad layers 104a, 104b cool, the difference in the coefficients of thermal expansion of the glass core layer 102 and the glass clad layers 104a, 104b cause a compressive stresses to develop in the glass clad layers 104a, 104b. The compressive stress increases the strength of the resulting laminated glass article.

Knoop scratch thresholds (KST) described herein are determined using a Knoop diamond indenter. The scratch threshold is determined by first identifying the load range for lateral crack onset. Once the load range is identified, a series of 5 mm long scratches under increasing constant load with three or more scratches per load are generated at a speed of 4 mm/s in order to identify the Knoop scratch threshold. Lateral cracks are defined as sustained cracks that are larger than twice the width of the groove.

In the embodiments described herein, the glass laminates have Knoop scratch thresholds greater than or equal to 2 Newtons (N). In some embodiments the glass laminates have Knoop scratch thresholds greater than or equal to 4 N or even greater than or equal to 6 N. In embodiments, the glass laminates described herein have Knoop scratch thresholds of greater than or equal to 2 N and less than or equal to 8 N or even greater than or equal to 4 N and less than or equal to 8 N. in some of these embodiments, the glass laminates described herein have Knoop scratch thresholds of greater than or equal to 2 N and less than or equal to 4 N or even greater than or equal to 4 N and less than or equal to 6 N. In still other embodiments, the glass laminates described herein have Knoop scratch thresholds of greater than or equal to 6 N and less than or equal to 8 N.

The laminated glass articles described herein can be useful in a variety of applications including, for example, auto-glazing, architectural, appliance, and consumer electronics (e.g., cover glass) applications. The combination of thin, ion exchangeable glass clad layers with relatively low elastic moduli with an ion exchangeable glass core layer with a relatively high elastic moduli provides the laminated glass articles with improved resistance to surface damage, such as scratching, and also with improved resistance to sharp impact damage, such as drop-induced damage and breakage.

EXAMPLES

The embodiments described herein will be further clarified by the following examples.

Example 1

A three-layered laminated glass article was formed with core glass composition C1 (Table 1) and clad glass composition CL1 (Table 2A). The glass clad layers had a thickness from about 25 μm to about 50 μm and the glass core layer had a thickness from about 750 μm to about 800 μm. It is noted that the variation in thickness of the glass clad layers and the glass core layer was due to the laboratory scale apparatus used to make the laminated glass articles for testing. The elastic modulus of the glass core layer was 76.67 GPa and the CTE was $84 \times 10^{-7}/°C$. The elastic moduli of the glass clad layers was 67.78 GPa and the CTE was $49.6 \times 10^{-7}/°C$. Based on the values of the elastic moduli, Poisons ratio, and CTE for each glass, the compressive stress in the glass clad layers due to the CTE mismatch between the glass clad layers and the glass core layers was determined to be approximately 150 MPa. For purposes of this calculation, ΔT was estimated to be the difference between the lower strain point temperature and room temperature.

Samples of the laminated glass article were ion exchange strengthened by immersing the samples in a molten salt bath of 100% $NaNO_3$ at 430° C. or 20 wt. % $NaNO_3$/80 wt. % $KNO_3$ for either 2.5 hours, 7 hours or 24 hours. Following the ion exchange treatment, the laminated glass articles were analyzed using electron probe microanalysis (EPMA) to determine the concentration of various constituent components of the glass (including $Na_2O$ and $K_2O$) as a function of depth from the surface of the laminated glass article. The results of the analysis are graphically depicted in FIGS. 4-7.

Figure 4:
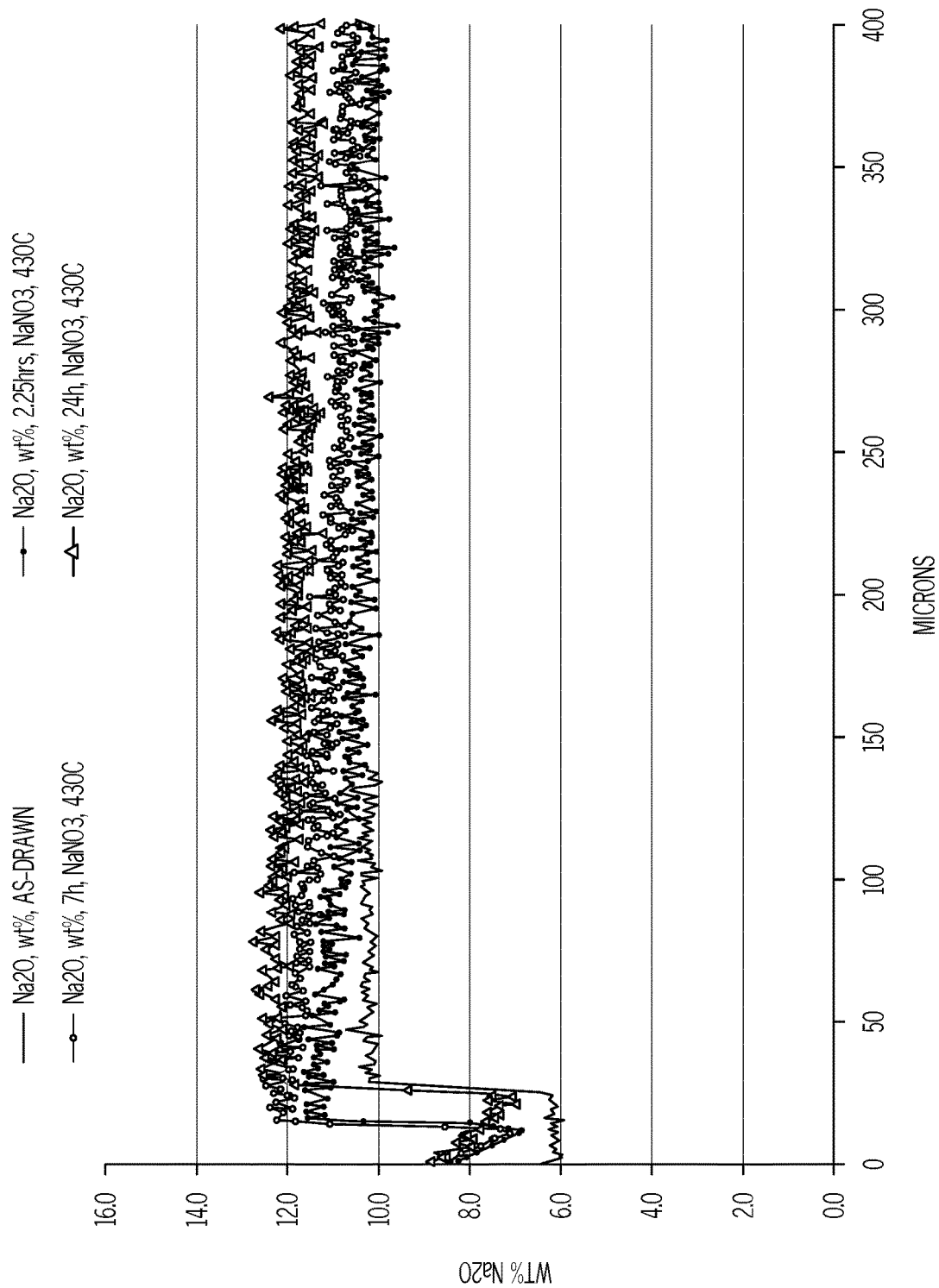
FIG. 4 graphically depicts the concentration of $Na_2O$ (Y-ordinate) as a function of depth (X-ordinate) for as-drawn and ion exchanged samples of the laminated glass articles.
Figure 5:
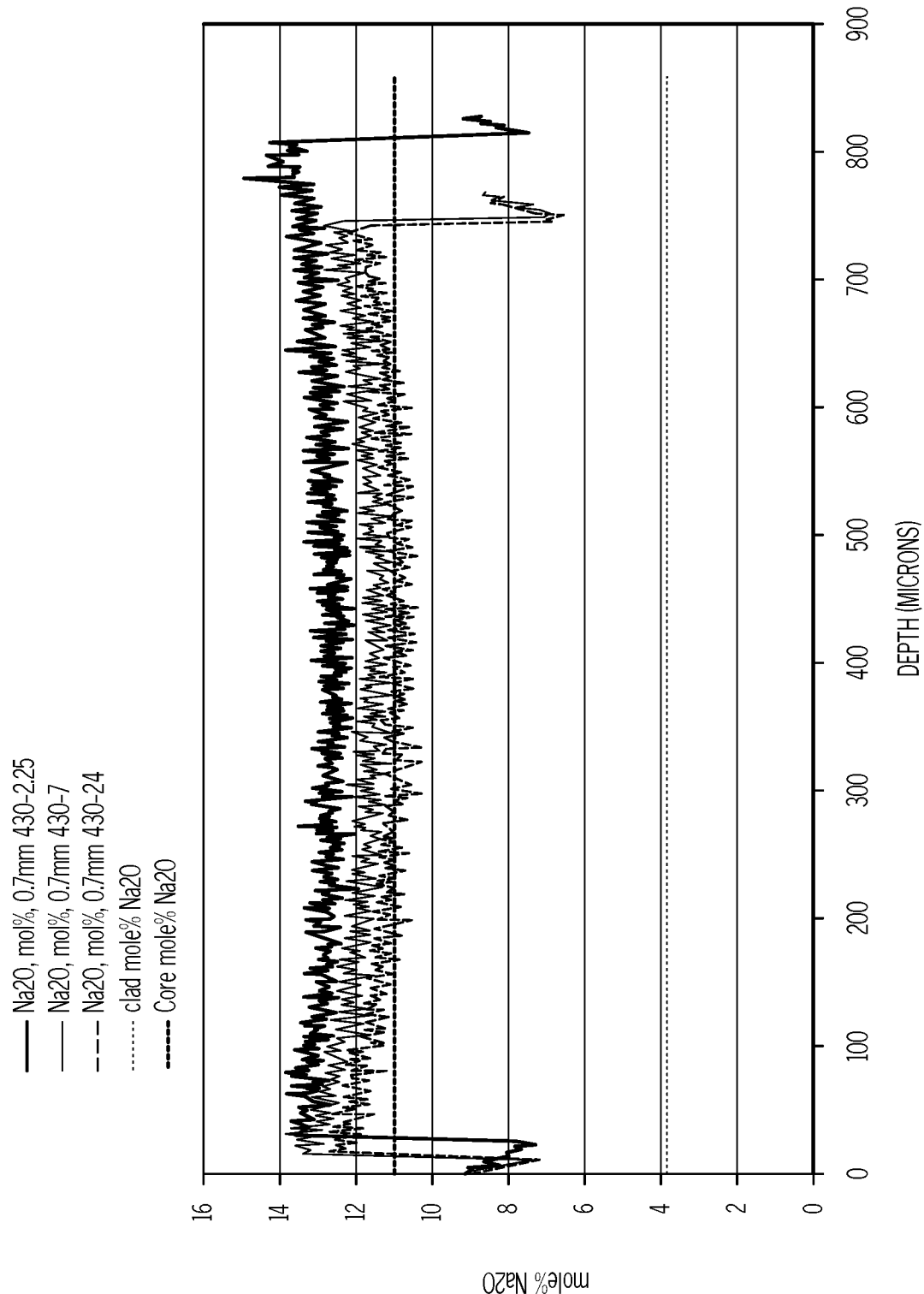
FIG. 5 graphically depicts the concentration of $Na_2O$ (Y-ordinate) as a function of depth (X-ordinate) for ion exchanged samples of the laminated glass articles.

FIG. 4 graphically depicts the concentration of $Na_2O$ as a function of depth for the as-drawn laminated glass articles and the laminated glass articles after ion-exchange in 100% $NaNO_3$ at 430° C. for 2.25 hours, 7 hours, and 24 hours. FIG. 5 graphically depicts the concentration of $Na_2O$ as a function of depth for the laminated glass articles after ion-exchange in 20 wt. % $NaNO_3$/80 wt. % $KNO_3$ at 430° C. for 2.25 hours, 7 hours, and 24 hours. As depicted in FIG. 4, the glass clad layer, as drawn, had a concentration of approximately 4 wt. % $Na_2O$ and the glass core layer, as drawn, had a concentration of approximately 10.0 wt. % $Na_2O$. The increase in the concentration of the clad glass from less than 4 wt. % to approximately 6 wt. % is believed to be due to the enrichment of the clad glass during the glass drawing process where the glass core composition and the glass clad compositions come into contact at temperatures of greater than 1000° C.

The data from the ion exchange treatments at 430° C. in FIGS. 4 and 5 indicates that diffusion of $Na_2O$ into and through the glass clad layer and into the glass core layer occurs, thereby increasing the concentration of $Na_2O$ in both the glass clad layer and the glass core layer. This data indicates that ion exchange takes place through the glass clad layer and into the glass core layer. The data also generally indicates that the concentration of $Na_2O$ in the glass clad layer generally decreases with increasing distance from the surface of the laminated glass article (i.e., depth=0) and that the concentration of $Na_2O$ in the glass core layer generally decreases with increasing distance from the core-clad interface (i.e., 25 μm-50 μm) to a centerline of the laminated glass article.

Figure 6:
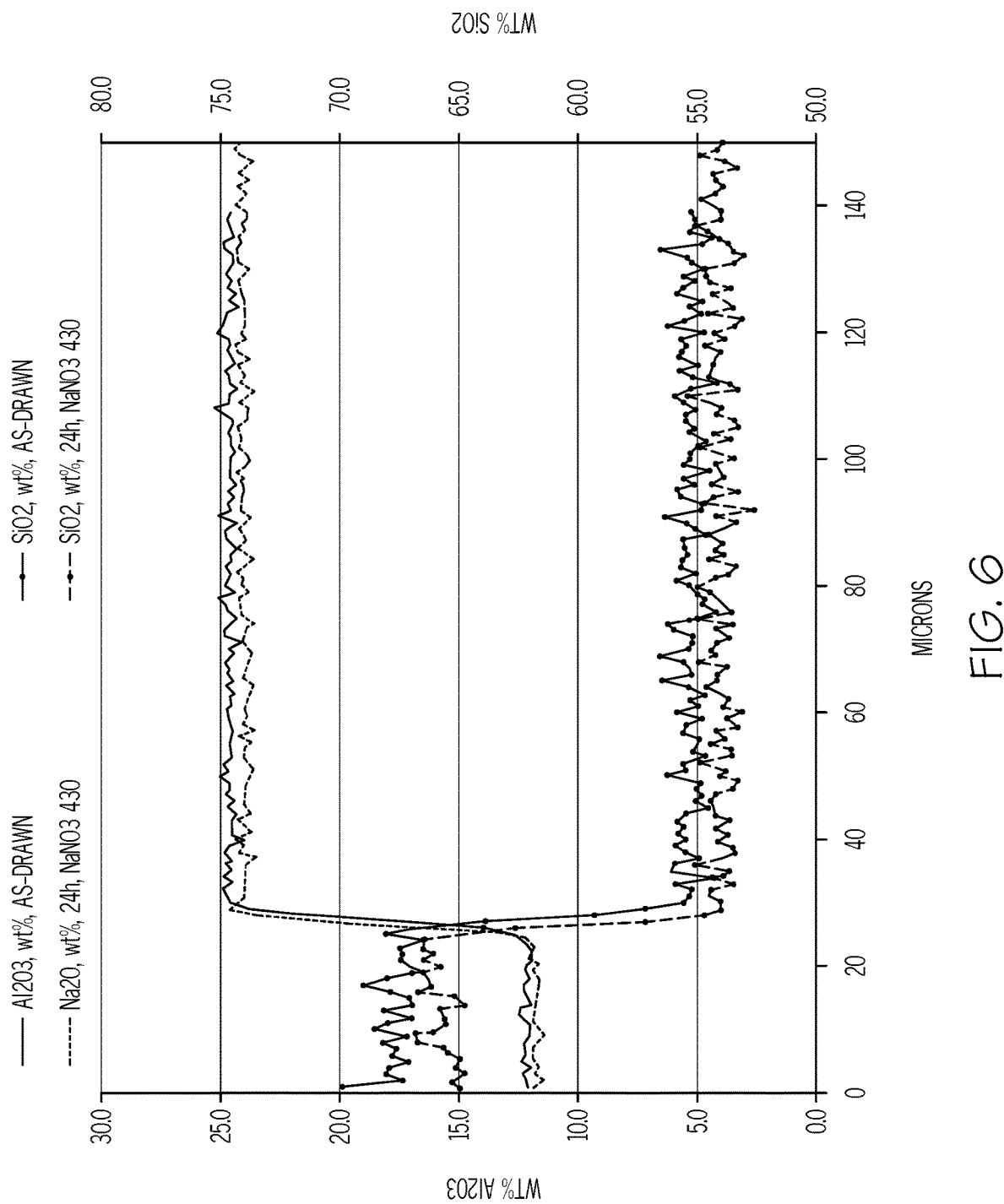
FIG. 6 graphically depicts the concentration of $Al_2O_3$ and $SiO_2$ (Y-ordinate) as a function of depth (X-ordinate) for as-drawn and ion exchanged samples of the laminated glass articles.

FIG. 6 graphically depicts the concentration of $Al_2O_3$ and $SiO_2$ as a function of depth for the as-drawn laminated glass articles and the laminated glass articles after ion-exchange in 100% $NaNO_3$ at 430° C. for 24 hours. This data generally indicates that the concentrations of non-alkali constituents (e.g., $Al_2O_3$ and $SiO_2$) remain constant through the thickness of laminated glass article before ion exchange and after ion exchange. This data supports the hypothesis that the ion-exchange process occurs through the thickness of the glass cladding layer and into the glass core layer (i.e., the data demonstrates that there is not a bulk diffusion of glass constituents across the core-clad interface—rather only the constituents subject to ion exchange exhibit an enrichment and that enrichment occurred on both sides of the interface).

Figure 7:
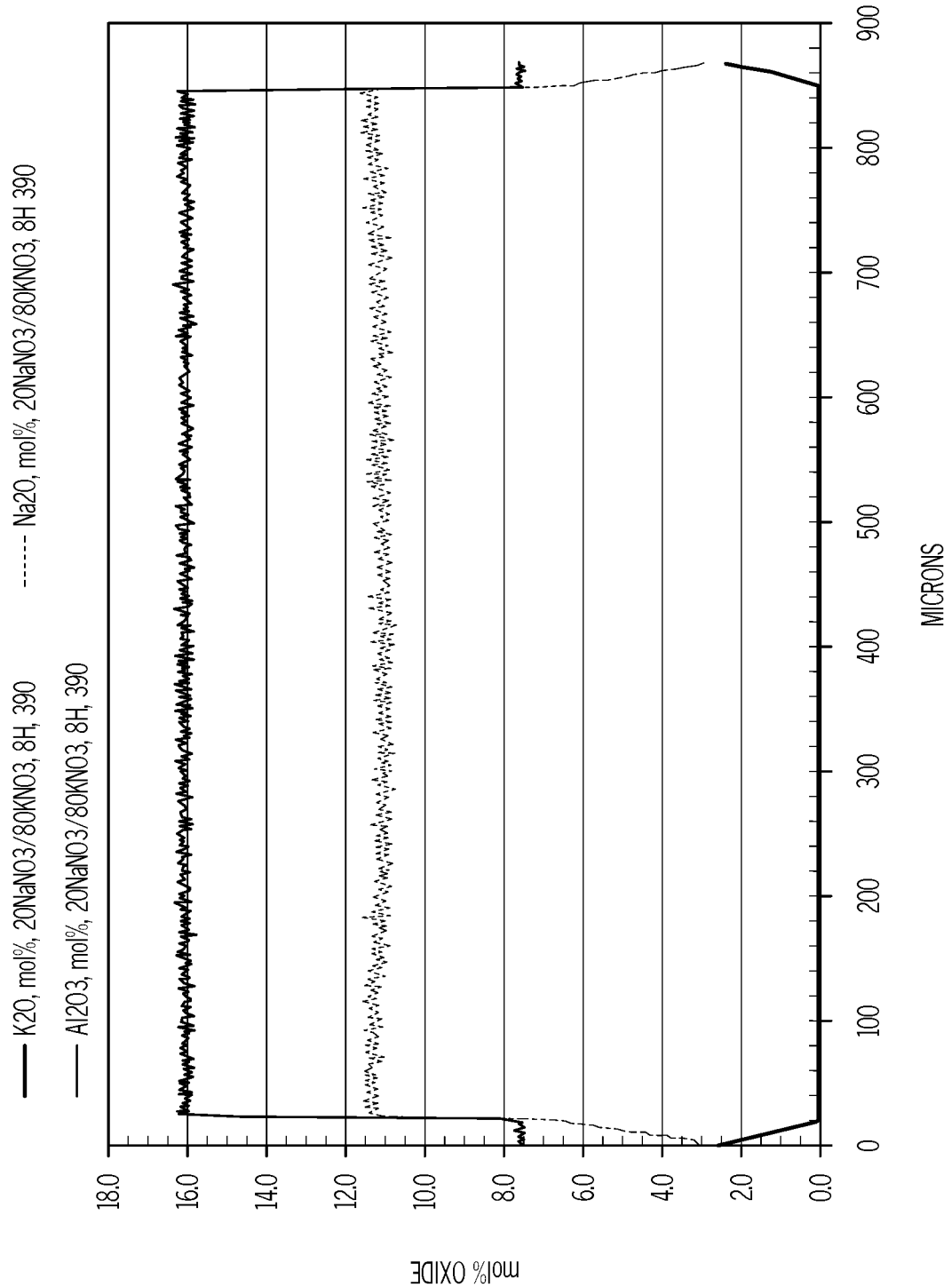
FIG. 7 graphically depicts the concentration of $Na_2O$, $K_2O$, and $Al_2O_3$ (Y-ordinate) as a function of depth (X-ordinate) for ion exchanged samples of the laminated glass articles.

FIG. 7 graphically depicts the concentration of $Al_2O_3$, $Na_2O$, and $K_2O$ as a function of depth for the laminated glass articles after ion-exchange in a mixed salt bath of 20 wt. % $NaNO_3$ and 80 wt. % $KNO_3$ at 390° C. for 8 hours. Comparing FIGS. 4 and 6 to FIG. 7, it is evident that the concentration of $Al_2O_3$ in the laminated glass article remained constant through the thickness of laminated glass article before ion exchange and after ion exchange in the mixed salt bath at 390° C. while the concentration of $Na_2O$ increased in the glass core layer after the ion exchange. The data also shows that some diffusion of $K_2O$ takes place across the core-clad interface, albeit to a lesser degree than $Na_2O$ due to the reduced mobility of $K_2O$ relative to $Na_2O$. Collectively, this data supports the hypothesis that ion exchange takes place through the glass clad layer and into the glass core layer.

A second set of samples was ion exchange strengthened in a molten salt bath of 80 wt. % $KNO_3$ and 20 wt. % $NaNO_3$ at 390° C. for either 4 hours or 16 hours. The compressive stress as a function of depth of compression from the surface of the laminated glass articles was then determined using the refractive near-field (RNF) technique. The results are graphically depicted in FIG. 8. As shown in FIG. 8, the glass clad layer has a surface compressive stress of greater than 400 MPa and the compressive stress throughout the glass clad layer is generally greater than 200 MPa. It is noted that the value for the surface compressive stress is extrapolated from the RNF profile rather than being directly measured. The compressive stress in the glass clad layer is due to both the ion exchange as well as the CTE differential between the glass core layer and the glass clad layer. FIG. 8 also shows that the compressive stress in the glass core layer is a maximum proximate to the core-clad interface and decreases with increasing distance, ultimately becoming tensile stress within the thickness of the glass clad layer.

Example 2

The ion exchangeability of the glass compositions of the glass core layers and the glass clad layers identified in Tables 1A, 1B, 2A, and 2B were assessed to determine the effect of free volume on ion exchange. Specifically, 1 mm thick coupons of each glass composition were annealed and then ion exchanged in a molten salt bath of 100% $KNO_3$ at 410° C. for 4 hours. Following ion exchange, the samples were analyzed with a fundamental stress meter (FSM) instrument to determine the surface compressive stress and depth of compression due to ion exchange. The results are reported in Tables 3A, 3B, 4A, and 4B.

TABLE 3A

Ion Exchange Characteristics of
Example Glass Core Layer Compositions

| | C1 | C2 | C3 | C4 | C5 | C6 | C7 |
|---|---|---|---|---|---|---|---|
| Compressive Stress (MPa) | 1031 | 1210 | 1260 | 1286 | 1331 | 1277 | 1339 |
| Depth of compression (μm) | 26 | 10 | 9 | 9 | 9 | 10 | 9 |

TABLE 3B

Ion Exchange Characteristics of Example
Glass Core Layer Compositions

|  | C8 | C9 | C10 | C11 | C12 | C13 |
|---|---|---|---|---|---|---|
| Compressive Stress (MPa) | 1201 | 1201 | 1195 | 1242 | 1235 | 1265 |
| Depth of compression (μm) | 11 | 13 | 6 | 12 | 10 | 12 |

TABLE 4A

Ion Exchange Characteristics of Example Glass Clad
Layer Compositions

|  | CL1 | CL2 | CL3 | CL4 | CL5 | CL6 |
|---|---|---|---|---|---|---|
| Compressive Stress (MPa) | 415 | 848 | 775 | 799 | 702 | 637 |
| Depth of compression (μm) | 14 | 13 | 15 | 13 | 15 | 15 |

TABLE 4B

Ion Exchange Characteristics of
Example Glass Clad Layer Compositions

|  | CL7 | CL8 | CL9 | CL10 | CL11 | CL12 | CL13 |
|---|---|---|---|---|---|---|---|
| Compressive Stress (MPa) | 566 | 830 | 825 | 813 | 813 | 771 | 795 |
| Depth of compression (μm) | 14 | 10 | 9 | 9 | 8 | 7 | 6 |

As shown in Tables 3A-4B, the glass core compositions achieved a higher surface compressive stress, demonstrating that glasses with a lower free volume (i.e., glasses with a higher refractive index) achieve higher compressive stresses when subjected to the same ion exchange conditions.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A laminated glass article comprising:
a glass core layer formed from an ion exchangeable, alkali-aluminosilicate core glass composition and comprising a core glass elastic modulus $E_C$; and
at least one glass clad layer fused directly to the glass core layer, the at least one glass clad layer formed from an ion exchangeable, alkali-aluminosilicate clad glass composition different than the ion exchangeable, alkali-aluminosilicate core glass composition and comprising a clad glass elastic modulus $E_{CL}$, wherein:
the laminated glass article has a total thickness T and the at least one glass clad layer has a thickness $T_{CL}$ that is less than 30% of the total thickness T;
$E_C$ is at least 5% greater than $E_{CL}$; and
$E_C$ is greater than 76.5 GPa and less than or equal to 90 GPa.

2. The laminated glass article of claim 1, wherein $E_{CL}$ is less than or equal to 76.5 GPa.

3. The laminated glass article of claim 2, wherein $E_{CL}$ is greater than or equal to 60 GPa.

4. The laminated glass article of claim 1, wherein a difference between $E_C$ and $E_{CL}$ is greater than or equal to 5 GPa.

5. The laminated glass article of claim 1, wherein the thickness $T_{CL}$ of the at least one glass clad layer is less than or equal to 5% of the total thickness T.

6. The laminated glass article of claim 1, wherein a core glass refractive index $n_C$ of the glass core layer is greater than a clad glass refractive index $n_{CL}$ of the at least one glass clad layer.

7. The laminated glass article of claim 6, wherein the clad glass refractive index $n_{CL}$ is greater than or equal to 1.45 and less than or equal to 1.55.

8. The laminated glass article of claim 1, wherein the at least one glass clad layer comprises a first glass clad layer and a second glass clad layer, wherein:
the first glass clad layer is fused directly to a first surface of the glass core layer; and
the second glass clad layer is fused directly to a second surface of the glass core layer opposite the first surface of the glass core layer.

9. The laminated glass article of claim 1, wherein:
the glass core layer has a core coefficient of thermal expansion $CTE_C$ from 20° C. temperature to 300° C.;
the at least one glass clad layer has a clad coefficient of thermal expansion $CTE_{CL}$ from 20° C. to 300° C.; and
$CTE_C$ is greater than or equal to $CTE_{CL}$.

10. The laminated glass article of claim 9, wherein a compressive stress in the at least one glass clad layer due to a difference between $CTE_C$ and $CTE_{CL}$ is greater than 100 MPa and extends from a surface of the at least one glass clad layer through a thickness of the at least one glass clad layer.

11. The laminated glass article of claim 1, wherein the laminated glass article is ion exchange strengthened such that the laminated glass article comprises a compressive stress region extending from a surface of the at least one glass clad layer and into the total thickness T of the laminated glass article to a depth of compression DOC.

12. The laminated glass article of claim 11, wherein:
the laminated glass article has a surface compressive stress $CS_0$ at the surface of the at least one glass clad layer; and
the depth of compression DOC is greater than or equal to 10% of the total thickness T.

13. The laminated glass article of claim 11, wherein:
the glass core layer has a core coefficient of thermal expansion $CTE_C$ from 20° C. to 300° C.;
the at least one glass clad layer has a clad coefficient of thermal expansion $CTE_{CL}$ from 20° C. to 300° C.; and
$CTE_C$ is greater than or equal to $CTE_{CL}$.

14. The laminated glass article of claim 11, wherein the laminated glass article has a Knoop scratch initiation threshold greater than or equal to 2 N and less than or equal to 8 N.

15. A laminated glass article comprising:
a glass core layer formed from an ion exchangeable, alkali-aluminosilicate core glass composition; and
at least one glass clad layer fused directly to the glass core layer at an interface region, the at least one glass clad layer formed from an ion exchangeable, alkali-aluminosilicate clad glass composition different than the ion exchangeable, alkali-aluminosilicate core glass composition, wherein:
the laminated glass article has a total thickness T and the at least one glass clad layer has a thickness $T_{cL}$ that is less than or equal to 30% of the total thickness T;

the laminated glass article is ion exchange strengthened such that the laminated glass article comprises a compressive stress region extending from a surface of the at least one glass clad layer into the total thickness T of the laminated glass article to a depth of compression DOC;

a concentration of at least one of $K_2O$ and $Na_2O$ decreases from a surface of the at least one glass clad layer to a clad side of the interface region; and the concentration of at least one of $K_2O$ and $Na_2O$ decreases from a core side of the interface region in a direction towards a centerline of the glass core layer, wherein the concentration of at least one of $K_2O$ and $Na_2O$ is less at the clad side of the interface region than a concentration of the same constituent at the core side of the interface region.

16. The laminated glass article of claim 15, wherein:
the at least one glass clad layer comprises at least one glass former and a concentration of the at least one glass former is substantially constant from a surface of the at least one glass clad layer to a clad side of the interface region; and
the glass core layer comprises at least one glass former and a concentration of the at least one glass former is substantially constant from a core side of the interface region to a middle region of the glass core layer.

17. The laminated glass article of claim 15, wherein:
the at least one glass clad layer comprises at least one glass modifier and a concentration of the at least one glass modifier is substantially constant from a surface of the at least one glass clad layer to a clad side of the interface region; and
the glass core layer comprises at least one glass modifier and a concentration of the at least one glass modifier is substantially constant from a core side of the interface region to a middle region of the glass core layer.

18. The laminated glass article of claim 15, wherein:
the glass core layer has a core coefficient of thermal expansion $CTE_C$ from 20° C. to 300° C.;
the at least one glass clad layer has a clad coefficient of thermal expansion $CTE_{cL}$ from 20° C. to 300° C.; and
$CTE_C$ is greater than or equal to $CTE_{cL}$.

19. The laminated glass article of claim 18, wherein a compressive stress in the at least one glass clad layer due to a difference between $CTE_C$ and $CTE_{cL}$ is greater than 100 MPa and extends from a surface of the at least one glass clad layer and through a thickness of the at least one glass clad layer.

20. The laminated glass article of claim 15 wherein:
the glass core layer comprises a core glass elastic modulus $E_C$; and
the at least one glass clad layer comprises a clad glass elastic modulus $E_{cL}$, wherein $E_C$ is greater than $E_{CL}$.

21. The laminated glass article of claim 15, wherein a difference between $E_C$ and $E_{CL}$ is greater than or equal to 5 GPa.

22. The laminated glass article of claim 15, wherein a core glass refractive index $n_C$ of the glass core layer is greater than a clad glass refractive index $n_{cL}$ of the at least one glass clad layer.

23. The laminated glass article of claim 22, wherein the clad glass refractive index $n_{cL}$ is greater than or equal to 1.45 and less than or equal to 1.55.

24. The laminated glass article of claim 15, wherein the depth of compression DOC is greater than or equal to 10% of the total thickness T.

25. The laminated glass article of claim 15, wherein the thickness $T_{cL}$ is less than or equal to 10% of the total thickness T.

* * * * *